(12) United States Patent
Vujic et al.

(10) Patent No.: US 7,559,343 B1
(45) Date of Patent: Jul. 14, 2009

(54) INSULATION MODULE FOR VESSELS

(75) Inventors: Milivoj Vujic, Willagee (AU); Brian Keenan, Mount Pleasant (AU)

(73) Assignee: KAEFER Integrated Services Pty Ltd, Perth (W.A.) (AU)

( * ) Notice: Subject to any disclaimer, the term of this patent is extended or adjusted under 35 U.S.C. 154(b) by 0 days.

(21) Appl. No.: 09/744,351

(22) PCT Filed: Jul. 8, 1999

(86) PCT No.: PCT/AU99/00562

§ 371 (c)(1),
(2), (4) Date: May 10, 2001

(87) PCT Pub. No.: WO00/05533

PCT Pub. Date: Feb. 3, 2000

(30) Foreign Application Priority Data

Jul. 23, 1998 (AU) .................................... PP4832

(51) Int. Cl.
*F16L 9/14* (2006.01)
(52) U.S. Cl. ............... 138/148; 138/149; 220/592.2; 220/592.24; 220/592.25
(58) Field of Classification Search ........... 138/148, 138/149; 220/592.2, 592.24, 592.25
See application file for complete search history.

(56) References Cited

U.S. PATENT DOCUMENTS

| | | | | |
|---|---|---|---|---|
| 340,691 | A * | 4/1886 | Aldrich ...................... 138/113 |
| 2,254,964 | A * | 9/1941 | Kettlewell ............... 220/592.22 |
| 2,326,717 | A * | 8/1943 | Zeidler ...................... 52/407.1 |
| 2,550,465 | A | 4/1951 | Gorski ........................ 154/44 |
| 2,928,565 | A * | 3/1960 | Glasoe, Jr. ............... 220/567.2 |
| 2,930,407 | A * | 3/1960 | Conley et al. ............... 138/114 |
| 2,955,686 | A * | 10/1960 | Blomeley et al. ............. 52/246 |
| 2,962,402 | A | 11/1960 | Sweeney ...................... 154/44 |
| 3,378,975 | A * | 4/1968 | Hill ............................ 52/508 |
| 3,425,456 | A | 2/1969 | Schibig ...................... 138/162 |
| 3,486,284 | A * | 12/1969 | Steinberger et al. ........... 52/262 |
| 3,523,395 | A * | 8/1970 | Rutter et al. .................. 52/410 |
| 3,878,658 | A * | 4/1975 | Davis et al. ................... 52/410 |
| 3,929,166 | A | 12/1975 | Westerheid ................. 138/149 |

(Continued)

FOREIGN PATENT DOCUMENTS

AU          59354/80          1/1981

(Continued)

OTHER PUBLICATIONS

Document Bibliography and Abstract of EP0297612, published Jan. 4, 1989 (Missel GmbH & Co.).

(Continued)

*Primary Examiner*—James F Hook
(74) *Attorney, Agent, or Firm*—Fox Rothschild LLP

(57) ABSTRACT

Described is an insulation module (1) for a vessel (2) used in a chemical plant. The module may take the form of a panel having an outer surface layer (3) and an insulation layer (5) secured to the outer surface layer (3). Mounting means (10) extends from the panel (1) and enables mounting of the insulation module (1) on an outer wall (2) of the vessel. An air gap (15) is provided between the insulation layer (3) and the outer vessel wall (2) when the insulation module is mounted (1) on the vessel (2).

13 Claims, 2 Drawing Sheets

U.S. PATENT DOCUMENTS

| | | | | |
|---|---|---|---|---|
| RE28,930 E | * | 8/1976 | Johnson | 138/158 |
| 4,044,517 A | * | 8/1977 | Schroter | 52/248 |
| 4,099,352 A | * | 7/1978 | Clark | 52/81.4 |
| 4,287,245 A | | 9/1981 | Kikuchi | 428/36 |
| 4,300,323 A | * | 11/1981 | Meechan et al. | 52/464 |
| 4,546,580 A | * | 10/1985 | Ueno et al. | 52/126.1 |
| 4,677,731 A | * | 7/1987 | Sommerer et al. | 29/525.12 |
| 5,020,481 A | | 6/1991 | Nelson | 122/494 |
| 5,611,374 A | | 3/1997 | Blin et al. | 138/149 |
| 6,399,186 B2 | * | 6/2002 | Matthews et al. | 428/306.6 |
| 6,403,182 B1 | | 6/2002 | Plummer et al. | 428/36.9 |

FOREIGN PATENT DOCUMENTS

| | | |
|---|---|---|
| DE | 37 30 357 | 3/1989 |
| DE | 297 06 323 | 7/1997 |
| FR | 1159733 | 7/1958 |
| FR | 2704930 | 11/1994 |
| FR | 2752191 | 2/1998 |
| GB | 2283798 | 5/1995 |
| GB | 2296749 | 7/1996 |
| WO | WO 99/57481 | 11/1999 |
| WO | WO 00/25058 | 5/2000 |

OTHER PUBLICATIONS

Abstract of DE29618681, published Oct. 27, 1996 (W. Hoefler).
Patent Abstracts of Japan, JP07-293786 (Dai Nappon) Nov. 1995.
Patent Abstracts of Japan, JP09-014578 (Dia Chem KK) Jan. 1997.
Document Bibliography and Abstract of DE4225448, published Feb. 3, 1994 (Janich GmbH & Co.).
Abstract of SU1104339, published Jul. 23, 1984 (Andreev VA)(Derwent Accession No. 85054566/09).
Abstract of SU706271, published Dec. 31, 1979 (Zhdanovtyazhmash)(Derwent Abstract Accession No. H2896C/34).
Abstract of SE8804-482-A, published Jun. 13, 1990 (Abb Carbon AB)(Derwent Abstract Accession No. 90-236876/81).

* cited by examiner

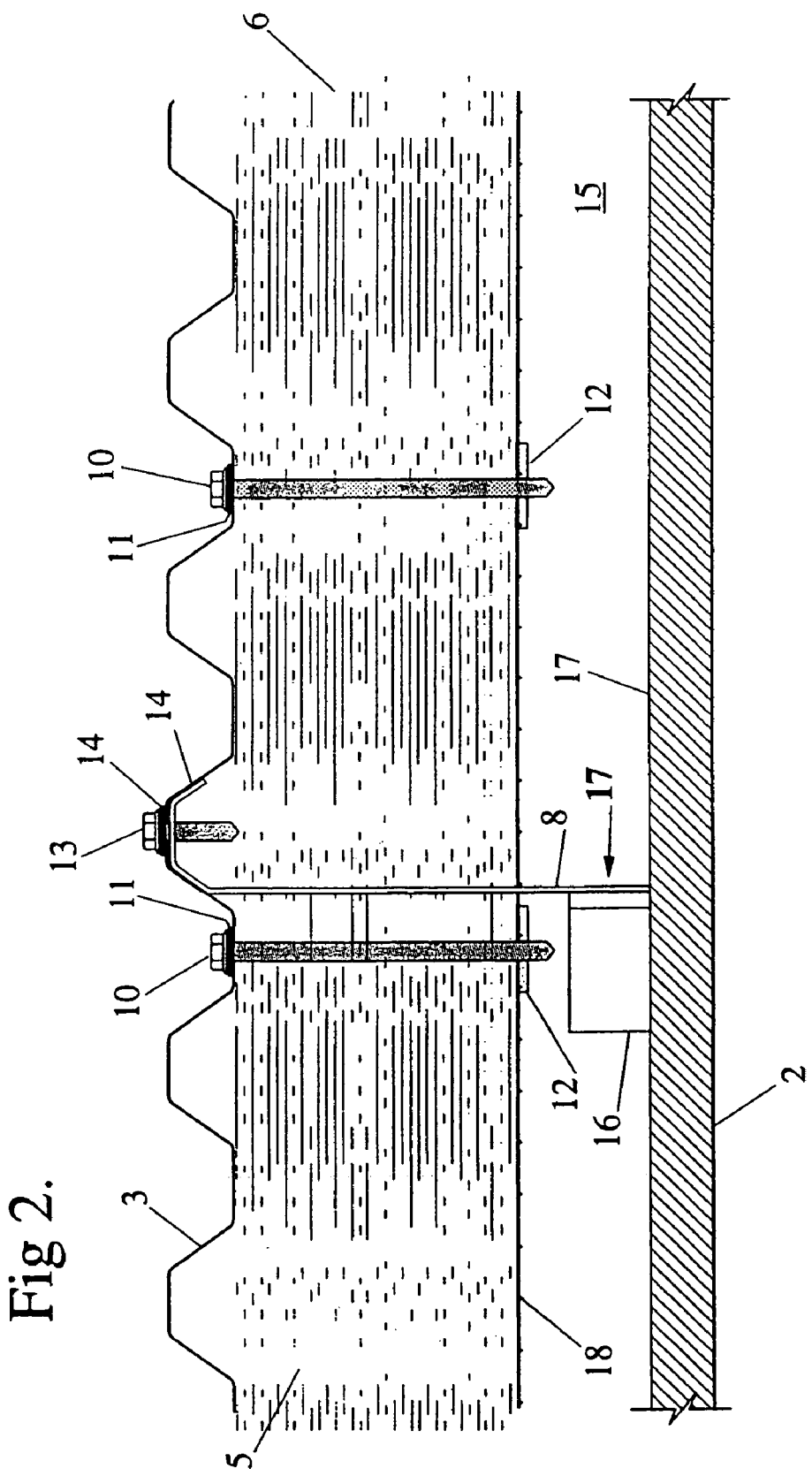

INSULATION MODULE FOR VESSELS

FIELD OF THE INVENTION

The present invention generally relates to insulation technology used in industrial and other applications, and in particular, to an insulation module for insulating a vessel, and a method of installing the insulation module. The present invention will be described with reference to its use on vessels used in chemical plants. It should however be appreciated that other applications of the insulation module are also envisaged.

BACKGROUND TO THE INVENTION

In chemical plants, tanks and other vessels holding or carrying materials such as solids, gases or liquids generally need to be maintained within controlled temperature limits for efficient use within the process being conducted within the chemical plant. One way of providing this temperature control is to provide insulation on the vessels and pipes of the plant.

The insulation of a chemical plant is however an expensive and time consuming process. In the case of vessels, a commonly used method of installing the insulation is to initially embed a series of pins over the surface of the outer wall of the vessel with each pin extending laterally therefrom. The insulation material can then be supported on the pins, with a sealing washer being provided at the end of each pin to retain the insulation and any retaining mesh in position. An outer metal cladding is then installed over the top of the insulation to provide protection for the insulation.

The current installation process therefore involves a series of steps. It is not, however, always possible to install pins, as for example in the case of thermally relieved vessels. Other means, such as straps, are then required to hold the insulation in position.

Furthermore, because the insulation material generally used is made of fibrous material such as, for example, fibreglass, the insulation of this material can pose a safety risk to the workers on site such that all non-insulation work must cease while the insulation is being installed. This may necessitate working in night environments where the cost of lighting and incidental costs of employment are commensurately higher than during the day.

Furthermore, because the insulation material is installed immediately against the outer wall surface of the vessel, and because the insulation material can retain moisture, this can potentially lead to corrosion problems for the vessel.

SUMMARY OF THE INVENTION

It is therefore an object of the present invention to avoid at least one of the above-noted disadvantages of existing insulation systems.

With this object in view, according to one aspect of the present invention, there is provided an insulation module for a vessel including a panel having an outer surface layer, and an insulation layer secured to the outer surface layer; and mounting means extending from the panel for enabling mounting of the insulation module on an outer wall of the vessel, wherein an air gap is provided between the insulation layer and the outer wall of the vessel when the insulation module is mounted relative thereto.

The provision of the air-gap leads to a number of advantages:

(a) because the insulation layer is separated from the wall of the vessel by the air gap, this minimises the possibility of corrosion due to the retention of moisture within the insulation layer.

(b) the air located within the air gap provides an additional insulation layer. This means that the insulation layer secured to the outer surface layer can be of a reduced thickness.

Furthermore, because the insulation layer is secured to the outer surface layer prior to insulation of the insulation module, the insulation layer can be treated to prevent the release of potentially hazardous fibres therefrom. For example, the insulation layer may be covered by material prior to securing to the outer surface layer. Alternatively, an adhesive paint may be sprayed on the outer surface of the insulation layer to prevent or minimise the release of fibres from that layer prior to securing to the outer surface layer. The Applicant's co-pending Australian Patent Application No. 26034/99 discloses a suitable sealing agent for this application of reducing fibre release.

The outer surface layer is dependent on the requirements of the plant operator. For example, the outer layer may be a corrugated sheet such as "Spandeck" (trademark) or may be a flat sheet. This outer layer can be made of steel or aluminium although other materials are also envisaged.

The insulation layer may be secured to the outer surface layer by securing means. For example, the insulation layer may be retained between the outer surface layer and a support mesh. Fastening means may extend between the outer surface layer through the insulation layer to the supporting mesh. The fastening means may for example be in the form of a fixing screw extending from the outer surface layer and through the insulation layer and the support mesh. A speed clip member may be secured to a free end of each fixing screw to retain the support mesh, and therefore the insulation layer in position against the outer surface layer.

According to another possible arrangement, the insulation layer may be adhered directly to the outer surface layer.

The mounting means may include a series of brackets secured to and extending from the outer surface layer towards the vessel wall when the insulation module is in an installed position. Each bracket may include a mounting leg for supporting the panel of the insulation module away from the vessel wall.

Vessels used in chemical plants typically have a series of cleats provided about the outer wall of the vessel to allow cladding to be fixed to the outside of the vessel. To this end, the bracket mounting legs may be secured to the cleats when installing each insulation module on the vessel. Each mounting can be bolted to or welded to a respective cleat. Alternatively, where no cleats are provided, the bracket mounting legs may be welded directly to the vessel wall. Alternatively, fastening means may specifically be provided to secure the bracket mounting legs to the vessel wall. For example, a series of thread rod stubs may be welded to the vessel wall. Each bracket mounting leg may include at least one laterally extending foot having at least one opening therethrough to accommodate a respective thread rod stub. A nut may then be screwed onto each thread and stub to hold the bracket, and therefore the insulation module in position.

The insulation layer may be made of a variety of different material and may be of different thickness. For example, rock wool, fibreglass, PIR foam or PUR foam and mixtures thereof could be used for the insulation layer. Fire retardants may be incorporated therein. The present invention is not restricted by the insulation material used in the insulation layer.

The insulation modules may be installed in an abutting or closely adjacent relationship to form a matrix covering at least a substantial portion of the outer wall of the vessel and thereby provide the necessary insulation for that vessel. Insulation may also be provided for conical sections of vessels. The present invention therefore eliminates the need to embed pins within the outer wall of the vessel. Furthermore, the installation procedure is a less time consuming single step process. In addition, maintenance of the installation is facilitated because individual modules can be readily removed and replaced with new modules as so required.

According to another aspect of the present invention, there is provided a method of installing insulation on a vessel including mounting a plurality of insulation modules in an abutting or closely adjacent relationship on an outer surface of the vessel, each insulation module including a panel having an outer surface layer, and an insulation layer secured to the outer surface layer, and mounting means extending from the panel for mounting the insulation module on the outer wall of the vessel, wherein the method includes securing the mounting means to the vessel to thereby provide an air gap between the insulation layer and the outer wall of the vessel when the insulation modules are mounted relative thereto.

According to yet another aspect of the present invention, there is provided an insulated vessel including a series of insulation modules as described above mounted in an abutting or closely adjacent relationship on an outer surface of the vessel.

BRIEF DESCRIPTION OF THE DRAWINGS

The various aspects of the invention may be more completely understood from the following description of an example arrangement of the present invention with reference to the accompanying drawings in which:

FIG. 2 is a detailed partial cross-sectional view of the insulation module of FIG. 1 mounted on a vessel wall.

DETAILED DESCRIPTION OF PREFERRED EMBODIMENT OF THE INVENTION

Figure 1:
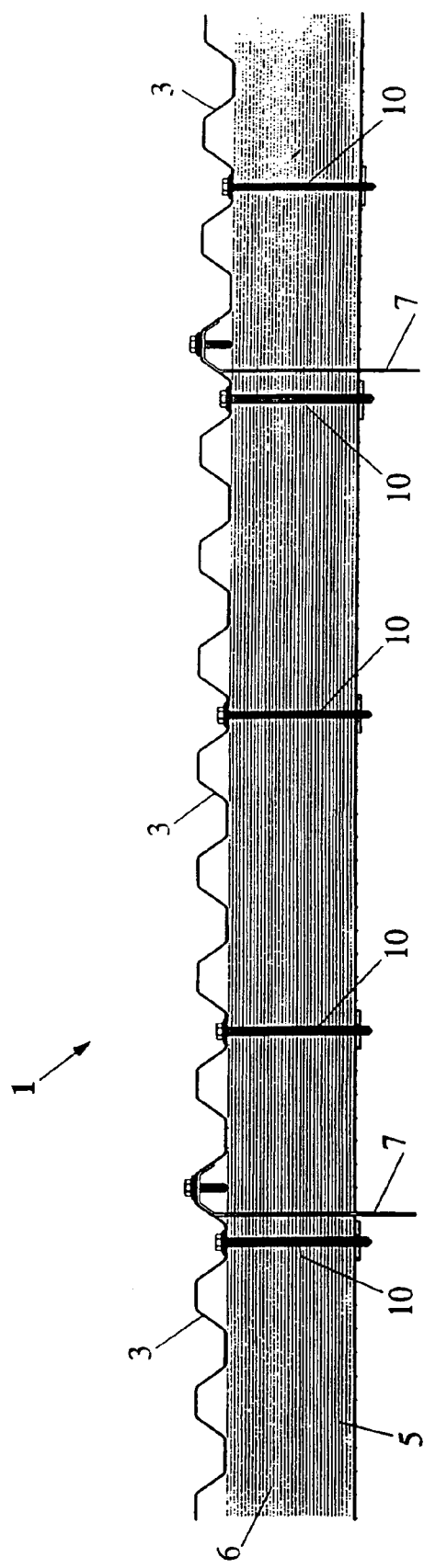
FIG. 1 is a cross-sectional view of an insulation module according to the present invention.

The insulation module 1 includes a panel having an outer surface layer 3 formed, for example, from at least one sheet of "Spandeck" (trade mark). The use of other sheet material is possible depending on client requirements. An insulation layer 5 is secured to the underside of the outer surface layer 3. This insulation layer 5 can be of any one of a number of different materials. For example, the insulation layer 5 can be provided by sheets of rock wool covered by a material layer to prevent the release of fibres from the rock wool. Alternatively, the rock wool could be replaced with fibreglass. In any event, release of fibres may be prevented by sealing the fibrous material stock with a sealing agent, perhaps an acrylic emulsion. Use of sealing agents for this application is described in the Applicant's co-pending Australian Patent Application No. 26034/99, filed 30 Apr. 1999, the contents of which are hereby incorporated by reference.

The insulation layer 5 is secured to the outer surface layer 3 by means of a series of fixing screws 10 inserted through the outer surface layer 3 and the insulation layer 5. A sealing washer 11 is located between the head of the fixing screw 10 and the outer surface layer 3. A sheet of wire mesh 18 is provided on the opposing side of the insulation layer 5 to help to support that layer 5. An end of the fastening screw 10 extends through the wire mesh 18, and a speed clip 12 is attached to the end of each fixing screw 10 to hold the wire mesh 18, and therefore the insulation layer 5 in position.

The insulation module 1 further includes a series of brackets 7. Each bracket 7 includes an upper end 9 shaped to conform with the general profile of the Spandeck sheet 3. Adjacent sheets 3 overlap along their respective edge portions. These sheets 3 are then secured to the bracket 7 by means of a further fixing screw 13 extending through the overlapping edge portions of the sheets 3 and the bracket upper end 9. A further sealing washer 14 is located between the head of the further fixing screw 13 and the Spandeck sheets 3.

Each bracket 7 further includes a mounting leg 8 which extends through the insulation layer 5 and the wire mesh 18 and extends beyond the assembled panel 6 of the insulation module 1.

A series of cleats 16 are typically provided along the exterior surface 17 of the vessel wall 2. The bracket 7 of the insulation module 1 are spaced along the insulation module 1 and correspond with the spacing of the cleats 16 on the vessel wall 2. The mounting leg 8 of each bracket 7 can then be secured to a respective cleat 16 to install the insulation module 1. The brackets 7 can be welded to or bolted to the cleats 16. Alternatively, where no cleats are provided, then the brackets 7 can be welded to the vessel wall 2.

A series of the insulation modules 1 can be installed in an abutting or closely adjacent relationship over the outer surface 17 of the vessel wall 2 to thereby at least substantially cover the vessel wall and thereby provide the necessary insulation for that vessel. Because the bracket 7 extends beyond the insulation module panel 6, an air gap 15 is provided between the insulation layer 5 and the vessel wall 2. This air gap 15 leads to the advantages described above.

It is also envisaged according to the present invention that the panel 6 of the insulation module 1 be formed from an outer surface layer having an insulation layer bonded directly to the outer surface layer.

Modifications and variations may be made to the present invention or consideration of the disclosure by the skilled reader of this disclosure. Such modifications and variations are considered to fall within the scope of the present invention.

The invention claimed is:

1. An insulation module for a process vessel having a sidewall, said process vessel for containing a material to be maintained within controlled temperature limits for use in a process, said insulation module comprising:

an outer surface layer;

a thermal insulation layer attached to said outer surface layer and opposing a portion of said sidewall of said process vessel;

a plurality of first fasteners extending between said outer surface layer and said thermal insulation layer for attaching said thermal insulation layer to said outer surface layer;

a plurality of brackets extending from said outer surface layer to said sidewall of said process vessel, said brackets being securable directly to said sidewall; and a plurality of second fasteners extending between said outer surface layer and said brackets for attaching said outer surface layer to said sidewall of said process vessel, said thermal insulation layer being positioned at a distance from said sidewall by said brackets and thereby defining an air gap between said thermal insulation layer and said sidewall.

2. An insulation module according to claim 1, wherein said outer surface layer comprises a corrugated panel having a plurality of crests and troughs.

3. An insulation module according to claim 2, wherein said first fasteners are attached to said corrugated panel at said troughs and said second fasteners are attached to said corrugated panel at said crests.

4. An insulation module according to claim 1, wherein said thermal insulation layer is a fibrous material treated to prevent escape of fibers.

5. An insulation module according to claim 4, further comprising a support mesh positioned between said thermal insulation layer and said sidewall of said process vessel.

6. An insulation module according to claim 4, further comprising a speed clip member secured to said fixing screw.

7. An insulation module according to claim 1, wherein said second fasteners comprise a fixing screw.

8. An insulation module according to claim 1, wherein each said bracket includes a mounting leg for supporting said outer surface layer away from said sidewall of said process vessel.

9. An insulation module according to claim 8, further comprising a plurality of cleats attachable to said sidewall, said mounting legs of said brackets being secured to said cleats.

10. An insulation module according to claim 8, further comprising a plurality of thread rod stubs for securing said bracket mounting legs to said sidewall, each of said bracket mounting legs including at least one opening therethrough to accommodate one of said thread rod stub.

11. An insulation module according to claim 1, wherein said thermal insulation layer is selected from the group of material consisting of rock wool, fiberglass, PIR foam, PUR foam and combinations thereof.

12. An insulation module according to claim 1, further comprising a support mesh positioned between said thermal insulation layer and said sidewall of said process vessel, said first fasteners extending between said outer surface layer and said support mesh securing said thermal insulation layer to said outer support layer.

13. A method of installing insulation on a sidewall of a process vessel, said method comprising:

attaching a thermal insulation layer to an outer surface layer using a plurality of first fasteners;

attaching said outer surface layer to said sidewall of said process vessel using a plurality of brackets positioning said outer surface layer at a distance from said sidewall and thereby defining an air gap between said thermal insulation layer and said sidewall; and attaching said outer surface layer to said brackets using a plurality of second fasteners.

\* \* \* \* \*